United States Patent [19]

Fite et al.

[11] Patent Number: 5,125,083
[45] Date of Patent: Jun. 23, 1992

[54] METHOD AND APPARATUS FOR RESOLVING A VARIABLE NUMBER OF POTENTIAL MEMORY ACCESS CONFLICTS IN A PIPELINED COMPUTER SYSTEM

[75] Inventors: David B. Fite; Tryggve Fossum; Ricky C. Hetherington, all of Northboro; John E. Murray, Acton; Jr. David A. Webb, Berlin, all of Mass.

[73] Assignee: Digital Equipment Corporation, Maynard, Mass.

[21] Appl. No.: 306,767

[22] Filed: Feb. 3, 1989

[51] Int. Cl.[5] .................. G06F 9/30; G06F 9/312
[52] U.S. Cl. .................. 395/375; 364/946.2; 364/231.8; 364/259.9
[58] Field of Search ... 364/200 MS File, 900 MS File

[56] References Cited

U.S. PATENT DOCUMENTS

| | | | |
|---|---|---|---|
| 3,601,809 | 8/1971 | Gray | 364/200 |
| 3,747,072 | 7/1973 | Lodi | 364/900 |
| 4,342,081 | 7/1982 | Dubuc | 364/200 |
| 4,345,309 | 8/1982 | Arulpragasam | 364/200 |
| 4,392,200 | 7/1983 | Arulpragasam | 364/200 |
| 4,589,067 | 5/1986 | Porter et al. | 364/200 |
| 4,642,794 | 2/1987 | Lavelle | 364/900 |
| 4,734,850 | 3/1988 | Torii et al. | 364/200 |
| 4,768,148 | 8/1988 | Keeley et al. | 364/200 |
| 4,785,415 | 11/1988 | Karlquist | 364/900 |
| 4,800,490 | 1/1989 | Tanaka et al. | 364/200 |
| 4,803,654 | 2/1989 | Rasberry | 364/900 |
| 4,890,254 | 12/1989 | Cooley | 364/900 |
| 4,894,797 | 1/1990 | Walp | 364/900 |
| 4,922,437 | 5/1990 | Sakata et al. | 364/200 |
| 4,949,301 | 8/1990 | Joshi | 364/900 |

*Primary Examiner*—David Y. Eng
*Attorney, Agent, or Firm*—Arnold, White & Durkee

[57] ABSTRACT

An operand processing unit delivers a specified address and at least one read/write signal in response to an instruction being a source of destination operand, and delivers the source operand to an execution unit in response to completion of the preprocessing. The execution unit receives the source operand, executes it and delivers the resultant data to memory. A "write queue" receives the write addresses of the destination operands from the operand processing unit, stores the write addresses, and delivers the stored preselected addresses to memory in response to receiving the resultant data corresponding to the preselected address. The addresses of the source operand is compared to the write addresses stored in the write queue, and the operand processing unit is stalled whenever at least one of the write addresses in the write queue is equivalent to the read address. Therefore, fetching of the operand is delayed until the corresponding resultant data has been delivered by the execution unit.

16 Claims, 8 Drawing Sheets

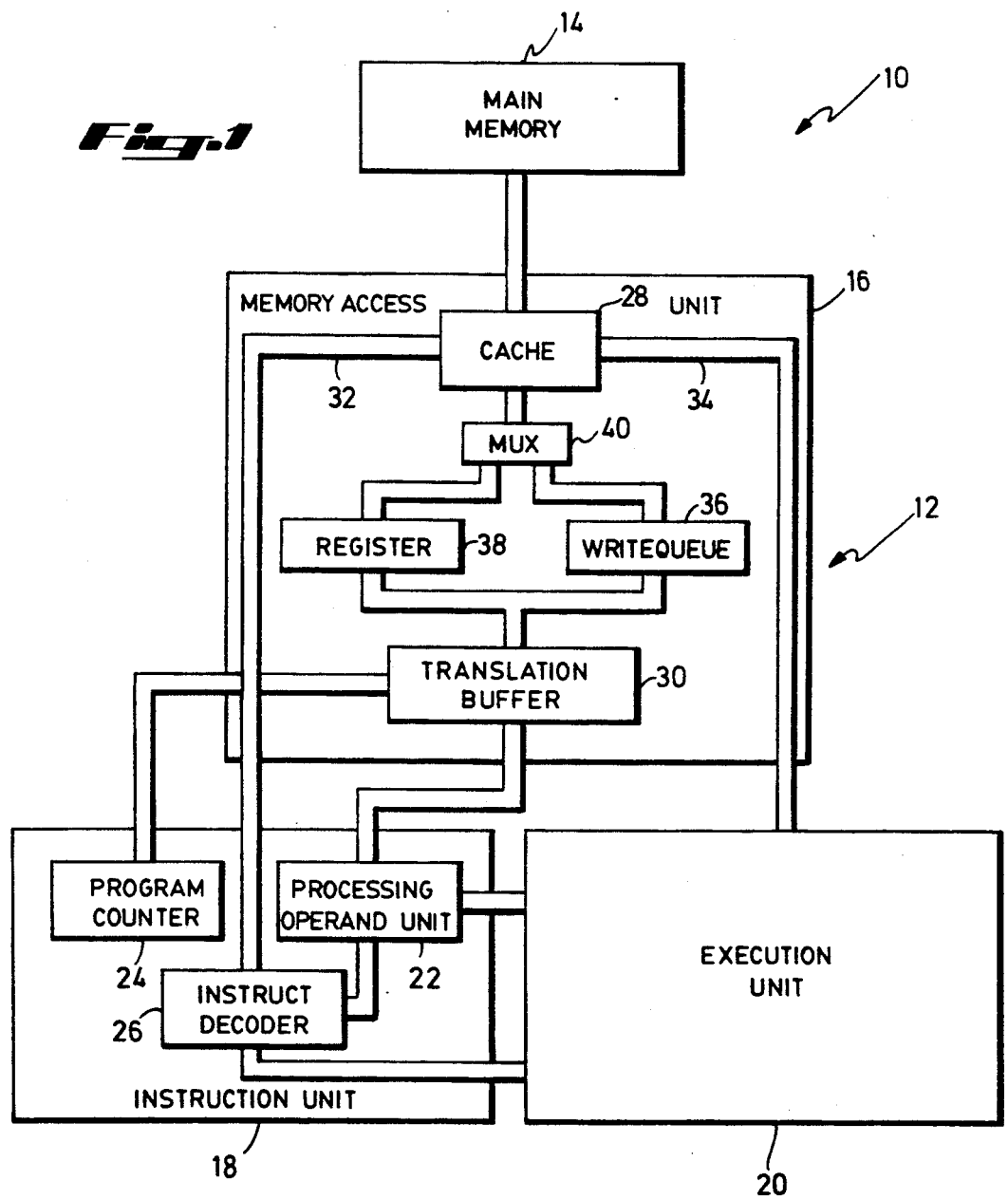

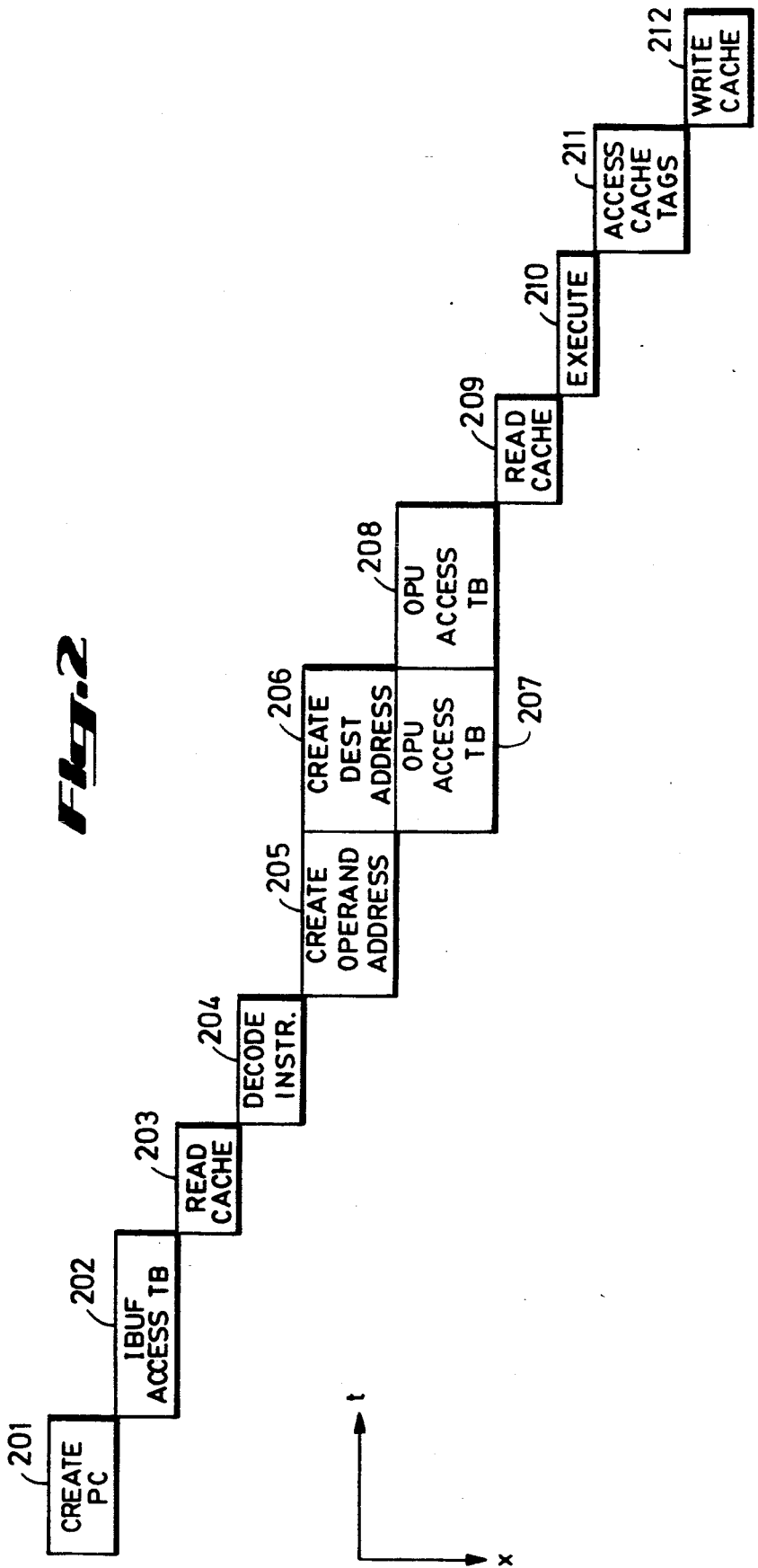

METHOD AND APPARATUS FOR RESOLVING A VARIABLE NUMBER OF POTENTIAL MEMORY ACCESS CONFLICTS IN A PIPELINED COMPUTER SYSTEM

RELATED APPLICATIONS

The present application discloses certain aspects of a computing system that is further described in the following U.S. patent applications filed concurrently with the present application: Evans Et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 07/646,522 filed Jan. 28, 1991; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. 07/306,343, filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989, and issued on Nov. 19, 1991 as U.S. Pat. No. 5,067,069; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989, now abandoned, and continued in Ser. No. 07/746,007 filed Aug. 9, 1991; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989 and issued as U.S. Pat. No. 5,043,874 on Aug. 27, 1991; Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, abandoned, continued in Ser. No. 07/582,493 filed Sept. 14, 1990.

FIELD OF THE INVENTION

This invention relates generally to an apparatus for controlling the memory access operations of a pipelined processor and more particularly to the use of a "write queue" for delaying the reading of memory locations that have prior write operations waiting in the write queue to be written.

DESCRIPTION OF RELATED ART

Conventional digital computers process data in accordance with "fetch-execute" cycles in which instructions are fetched from memory and executed. Each cycle may include a number of intermediate steps, depending on the specific instruction. An instruction, for example, may specify operands which must be fetched from memory before the instruction is executed.

In small, low-speed computers, the fetch-execute cycle is performed for one instruction at a time. For example, the fetch of the next instruction does not occur until the result of the current instruction has been stored. The hardware devoted to each step in the fetch-execute cycle is used only during that corresponding step and then remains idle until needed for the next instruction.

Larger computers shorten their execution time by prefetching instructions, so that the next instruction is ready for decoding as soon as the result of the current instruction is stored. This is a simple form of "pipelining" in which the first step in the cycle is performed for the next instruction at the same time that the last step is performed for the current instruction. This simple form of pipelining decreases the total time for performing the instructions, although it is possible that the incorrect instruction could be prefetched in the event that the current instruction changes the memory location from which the next instruction is supposed to be fetched.

This could occur upon completion of execution of a jump or branch instruction which changes the value of a "program counter" which points to the address of the instruction being fetched. Therefore, control logic is needed that will stop execution of the prefetched instruction and will cause the correct instruction to be fetched from memory.

The most advanced computers pipeline the entire sequence of instruction activities. A prime example is the VAX 8600 computer manufactured and sold by Digital Equipment Corporation, 111 Powdermill Road, Maynard, MA 97154-1418. The instruction pipeline for the VAX 8600 is described in T. Fossum et al., "An Overview of the VAX 8600 System," Digital Technical Journal, No. 1, August 1985, pp. 8-23. Separate pipeline stages are provided for instruction fetch, instruction decode, operand address generation, operand fetch, instruction execute, and result store. The pipeline stages are usually busy processing successive instructions, but movement through the pipeline cannot always be at top speed. Various stages must sit idle whenever data must be fetched from main memory instead of a high speed cache memory that stores previously addressed data blocks, or when a multiplication or division ties up the instruction execution stage.

The more advanced pipeline systems, however, encounter additional conflicts between the pre-processing of subsequent instructions and the execution of previous instructions. One such conflict occurs when the fetch of an operand for a subsequent instruction desires to read a memory location which is to be written by a yet uncompleted, but prior write instruction. For example, the operand address is typically available in the early stages of the pipeline, but the correct data to be read from that address only becomes available at the completion of the previous write instruction when the correct data is stored. Accordingly, the fetching of the operand address must be stalled until the correct data becomes available. Therefore, before operand data is fetched from memory, control logic looks ahead at any instruction being executed and any result being stored. If a result is being stored at the operand address to be read, then the control logic enables a transfer gate to permit the operand fetch stage to obtain the correct data directly from the result store stage. If, however, an instruction is being executed which will cause a result to be stored at the operand address, then the fetch stage must be stalled until execution is finished.

A second problematic aspect of pipeline processing occurs when a branch instruction is fetched. To maintain a full pipeline, control logic must predict which branch the program will follow and begin executing those instructions in the pipeline. The actual process used in the branch prediction is unimportant for the discussion here. It is sufficient to realize that, whatever the process, it will occasionally be wrong and all of the partially processed instructions must be flushed from the pipeline.

To further increase the average rate at which instructions are performed, it is desired to continue to pre-process instructions even though an instruction execution stage becomes tied up executing a complex instruction search as a multiplication or division. In the general case, the execution stage would be tied up for a variable length of time, and a variable number of instructions would be pre-processed in the interim. Each pre-processed instruction, however, could eventually cause data in memory to change, including data stored at the operand address of the next instruction to be pre-processed. Moreover, when an incorrect branch is detected, some of the pre-processed instructions must be flushed from the pipeline and they should no longer be considered as a source of potential conflict with the pre-processing of subsequent instructions.

SUMMARY OF THE INVENTION

To resolve a variable number of potential memory access conflicts that arise in a pipelined processor during the prefetching of multiple operands, a method and apparatus are provided for controlling memory access instructions during program execution. Means for pre-processing the instructions delivers a preselected address and one of a read and write signal in response to the instruction respectively being a source and destination operand, and delivers the operand in response to completion of the preprocessing. Executing means receives the operand, executes the source operand and delivers the resultant data to memory, and executes the destination operand in response to receiving the data from the memory. Write buffer means receives the preselected addresses and read and write signals from the pre-processing means, stores the preselected addresses corresponding to the write signals, and delivers the stored preselected addresses to memory in response to receiving the data corresponding to the preselected address. Means compares the addresses corresponding to the read signals with each of the addresses stored in the write buffer means, and delivers a delay signal in response to at least one of the write buffer addresses being equivalent to the read address. Finally, means for delaying the fetching of the operand is responsive to the delay signal, whereby fetching of the operand is delayed until the corresponding write buffer address has been delivered to memory.

BRIEF DESCRIPTION OF THE DRAWINGS

Other objects and advantages of the invention will become apparent upon reading the following detailed description and upon reference to the drawings in which:

FIG. 1 is a top level block diagram of a portion of a central processing unit and associated memory;

FIG. 2 is a functional diagram of the pipeline processing of a longword MOVE operand;

Figure 8:
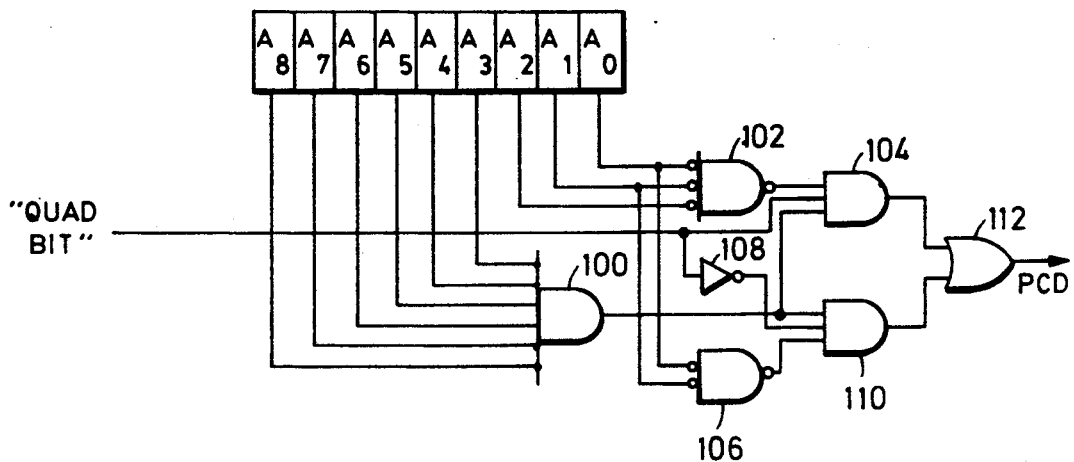
FIG. 8 is a schematic diagram of a circuit for detecting when a write operation will result in a page crossing; and, FIG. 9 is a functional diagram illustrating control logic for flushing the write queue registers.

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

FIG. 1 is a top level block diagram of a portion of a pipelined computer system 10. The system 10 includes at least one central processing unit (CPU) 12 having access to main memory 14. It should be understood that additional CPUs could be used in such a system by sharing the main memory 14. It is practical, for example, for up to four CPUs to operate simultaneously and communicate efficiently through the shared main memory 14.

Inside the CPU 12, the execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process can be analogized to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

As shown in FIG. 1. the CPU 12 is partitioned into at least three functional units: a memory access unit 16, an instruction unit 18, and an execution unit 20. These units are sometimes referred to as the MBOX, IBOX and EBOX, respectively.

The instruction unit 18 prefetches instructions, decodes opcodes to obtain operand and result specifiers, fetches operands, and updates a program counter 24. The instruction unit 18 includes an operand processing unit 22, the program counter 24, and an instruction decoder 26. The program counter 24 is maintained in the instruction unit 18, so that the proper instructions can be retrieved from a high-speed cache memory 28 maintained in the memory access unit 16. The cache 28 stores a copy of a small portion of the information stored in main memory 14 and is employed to increase processing speed by reducing memory access time. Operation of the cache 28 is described in greater detail below in conjunction with the description of the memory access unit 16.

The program counter 24 preferably uses virtual memory locations rather than the physical memory locations of main memory 14 and cache 28. Thus, the virtual address of the program counter 24 must be translated into the physical address of main memory 14 before instructions can be retrieved. Accordingly, the contents of the program counter 24 are transferred to the memory access unit 16 where a translation buffer 30 performs the address conversion. The instruction is retrieved from its physical memory location in cache 28 using the converted address. The cache 28 delivers the instruction over the data return lines 32 to the instruction decoder 26. The organization and operation of the cache 28 and translation buffer 30 are further described in Chapter 11 of Levy and Eckhouse, Jr., Computer Programming and Architecture, The VAX-11, Digital Equipment Corporation, pp. 351–368 (1980).

The operand processing unit (OPU) 22 also produces virtual addresses. In particular, the OPU 22 produces virtual addresses for memory source (read) and destination (write) instructions. For at least the memory read instructions, the OPU 22 must deliver these virtual addresses to the memory access unit 16 where they are translated to physical addresses. The physical memory locations of the cache 28 are then accessed to fetch the operands for the memory source instructions.

In order to practice the preferred method of the present invention, the OPU 22 also delivers to the memory access unit 16 the virtual addresses of the destinations for the memory destination instructions. The virtual address, for example, is a 32-bit number. In addition to transmitting the 32-bit virtual address, the OPU 22 also delivers a 3-bit control field to indicate whether the instruction specifies a read or write operation. In the event that the control field indicates that the virtual address corresponds to a read instruction, the cache 28 retrieves the data from the identified physical memory location and delivers it over data return lines 34 to the execution unit 20.

Conversely, for a write operation the write address is stored until the data to be written is available. Clearly, for instructions such as MOVE or ADD, the data to be written is not available until execution of the instruction has been completed. However, the virtual address of the destination can be translated to a corresponding physical address during the time required for execution of the instruction. Also, it is desirable for the OPU to preprocess multiple instruction specifiers during this time in order to increase the overall rate at which instructions are performed. For these purposes, the memory access unit 16 is provided with a "write queue" 36 intermediate the translation buffer 30 and the cache 28 for storing the physical destination addresses of a variable number of write operations. The write queue 36 maintains the address until the execution unit 20 completes the instruction and sends the resulting data to the memory access unit 16. These data are paired with the previously stored write address and written into the cache 28 at that memory location.

The OPU 22 also operates on instructions which are not memory operands. For example, the OPU 22 also processes immediate operands, short literals and register operands. In each of these types of instructions the OPU 22 delivers its results directly to the execution unit 20.

The first step in processing the instructions is to decode the "opcode" portions of the instruction. The first portion of each instruction consists of its opcode which specifies the operation to be performed in the instruction. The decoding is done using a standard table-lookup technique in the instruction decoder 26. The instruction decoder finds a microcode starting address for executing the instruction in a look-up table and passes the starting address to the execution unit 20. Later the execution unit performs the specified operation by executing prestored microcode, beginning at the indicated starting address. Also, the decoder determines where source-operand and destination-operand specifiers occur in the instruction and passes these specifiers to the operand processing unit 22 for pre-processing prior to execution of the instruction.

The memory access unit 16 includes the cache 28, the translation buffer 30, the write queue 36, a register 38, and a multiplexer 40. As noted above, the cache 28 is a high speed memory storing a copy of a small portion of the information stored in main memory. The cache 28 is accessible at a much higher rate than the main memory. Its purpose, therefore, is to reduce the average time necessary for a memory access (i.e., a read or write) to be performed. Since the cache 28 stores only a small portion of the information stored main memory, there will occasionally be instructions which attempt to access memory not contained in the cache 28. The cache 28 recognizes when these "misses" occur, and in these instances the cache 28 retrieves the identified data from main memory 14. Of course, during these "misses" performance of the CPU 12 will suffer, but the overall memory access speed is increased.

The translation buffer 30 is a high speed associative memory which stores the most recently used virtual-to-physical address translations. In a virtual memory system, a reference to a single virtual address can cause several memory references before the desired information is made available. However, where the translation buffer 30 is used, translation is reduced to simply finding a "hit" in the translation buffer 30.

Once The virtual-to-physical address translation is complete, the physical address is transferred to one of the write queue 36 and the register 38. As its name suggests, the write queue 36 receives the physical address only if the corresponding instruction is a write to memory. The purpose of the write queue 36 is to provide a temporary storage location for the physical write address of the write instruction. Because of the pipeline nature of the CPU 12, the write address is available before the data to be stored there. In fact, the data will only become available after the execution of the instruction in the execution unit 20. Moreover, because it is desired to pre-process multiple operand specifiers for instructions in the pipeline, it is likely that there will be a plurality of physical write addresses waiting for their corresponding data. Accordingly, the write queue 36 is a multiple position first-in, first-out buffer to accommodate a plurality of physical write addresses.

Conversely, if the instruction corresponding to the physical address is a read instruction, then the translation buffer 30 provides the physical address for an operand of the read instruction. The read address is transferred to the register 38 where it is selected by the multiplexer 40 and delivered to the cache 28. The cache 28 accesses the identified memory location and delivers the data stored at that location to the execution unit 20 via the data return lines 34.

The ability of the CPU 12 to immediately access the cache 28 during operand fetch for the reads, but being delayed during instruction execution for the writes, can cause timing problems in the pipeline. For example, sequential instructions often require the first instruction to modify a memory location while the subsequent instruction reads this same address. Since both instructions are being executed in a series of smaller steps it is possible for the read and write operations to be performed out of sequence. Even when the specifiers for the write instruction are processed before the specifiers for the read instruction, and the write operation is executed before the read operation, the delay in execution may allow one or more operands for the read operation to be fetched before the result of the write operation is stored. As a result of the fetch of the read operands "stale" data might be returned to the execution unit. Accordingly, the CPU 12 must be capable of stalling the read operation until the prior write operation to that same address can be completed.

FIG. 2 illustrates the operation of the instruction pipeline for a 4-byte move instruction of the form "MOVL MEM1, MEM2" where MOVL designates the operation to be performed and MEM1 and MEM2 are operand specifiers specifying a source address and a destination address, respectively. The boxes along the diagonal direction in FIG. 2 show the successive actions that CPU 12 takes to perform the move instruction. From left to right in FIG. 2, the actions occur at eleven successively advanced cycles or intervals in time (t). From top to bottom in FIG. 2, the actions occur in ten successive stages along the extent (x) of the pipeline.

In the first stage the program counter (PC) 24 for that instruction is created at location 201. This is done either by incrementing the value of the program counter (24 in FIG. 1) for the previous instruction, or by using the target address of a branch instruction. In the second stage, at location 202, the instruction unit accesses the translation buffer (30 in FIG. 1) with the virtual address of the program counter. The translation buffer converts the virtual address to a physical address and downloads a block of data from the memory unit cache 28 to a buffer or cache (not shown) in the instruction unit. It is only necessary to perform the second stage if the buffer or cache in the instruction unit does not contain the instruction indicated by the PC 24. The cache is read at location 203 in the third stage to retrieve the instruction MOVL indicated by the PC 24. At location 204 the fourth stage decodes the instruction by accessing the decode table with the opcode from MOVL (DO).

Thereafter, in the fifth stage at location 205 the operand virtual address is created from the first argument MEM1. Similarly, at a later time in the fifth stage at location 206, the destination virtual address is created from the second argument MEM2. At this same time in the sixth stage, at location 207, the OPU 22 accesses the translation buffer 30 to convert the operand virtual address into a physical address. Likewise, at a later time in the sixth pipeline stage, at location 208, the OPU 22 accesses the translation buffer 30 to convert the destination virtual address into a physical address.

Of course, the write operation to the physical address corresponding to MEM2 cannot be completed until the data to be stored has been read at the physical address corresponding to MEM2. Thus, the MEM2 address is stored in the write queue 36 until the data is available. The seventh stage at location 209 reads the memory access unit cache 28 and delivers that data to the execution unit 20.

In the eighth stage, at location 210, all of the operand data and result addresses are available, and the instruction is executed. In the ninth stage, at location 211, the data and a write flag are delivered to the memory unit 16, the write queue address is removed from the write queue, and the cache tags are accessed to test for a cache hit. Assuming a cache hit, the actual write occurs in the tenth and final stage at location 212.

Figure 3:
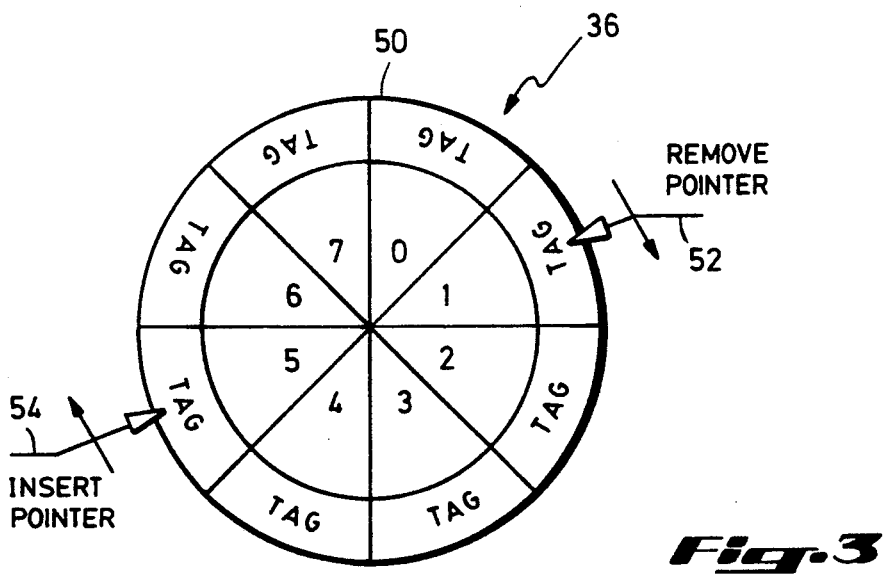
FIG. 3 is a functional diagram of an eight entry circular buffer for queuing write operations.

Referring now to FIG. 3, the write queue 36 is diagrammatically illustrated as an eight-entry circular buffer 50. The write queue 36 includes a remove pointer 52 and an insert pointer 54. The physical write address delivered by the translation buffer 30 is loaded into one of the eight registers (0-7) indicated by the insert pointer 54. After each write address is loaded into the write queue 36, the insert pointer 54 is incremented in a clockwise manner so that it always indicates the location of the next register in which an address is to be loaded.

Similarly, the remove pointer 52 indicates which register contains the address corresponding to the next data received from the execution unit 20. That address is removed and the data from the execution unit 20 is stored in cache at the desired physical memory location. The remove pointer 52 is incremented in a clockwise manner.

Both the remove and insert pointers 52,54 wrap around from register 7 to register 0 and can indicate any one of the eight write queue registers (0-7). Accordingly, only those registers from the current remove pointer location in a clockwise direction toward, but not usually including, the insert pointer position contain valid write addresses. (The insert pointer position contains a valid write address only when the queue is full; this occurs when the insert pointer points to the same position as the remove pointer). For example, with the pointers 52,54 in the positions illustrated in FIG. 3, registers 1-4 contain valid write addresses. Registers 5, 6, 7, and 0 do not contain valid addresses and are so indicated by a flag set in the tag portion of each register. These registers can contain invalid addresses for two reasons. First, near the beginning of the execution of a program the registers may simply not have been used yet. Second, a valid address inserted in the write queue becomes "stale" after it is used. Upon receipt of result data from the execution unit 20, the valid address is removed from the write queue, and the valid flag at the remove pointer location is reset before the remove pointer is incremented to prevent the address from being reused.

The physical address stored in the write queue registers is preferably 29-bits long, and it is stored with a 5-bit tag, including the valid bit. The other four tag bits are used as flags to indicate various aspects of the physical address. The tag includes a bit 0 which is a "fault bit" indicating whether a page fault occurred during the respective virtual-to-physical address translation which generated the physical address. Bit 1 is a "last bit" indicating whether the physical address is the last in a series of addresses for a multiprecision result. Bit 2 is a "new quad bit" indicating whether the physical address should be used to write two different parts of a quadword Bit 3 is a "quad bit" indicating whether the physical address identifies the location of part of a quadword. Finally, bit 4 is the "valid bit." The function of these tag bits is discussed in more detail in conjunction with FIGS. 5 and 9.

Figure 4:
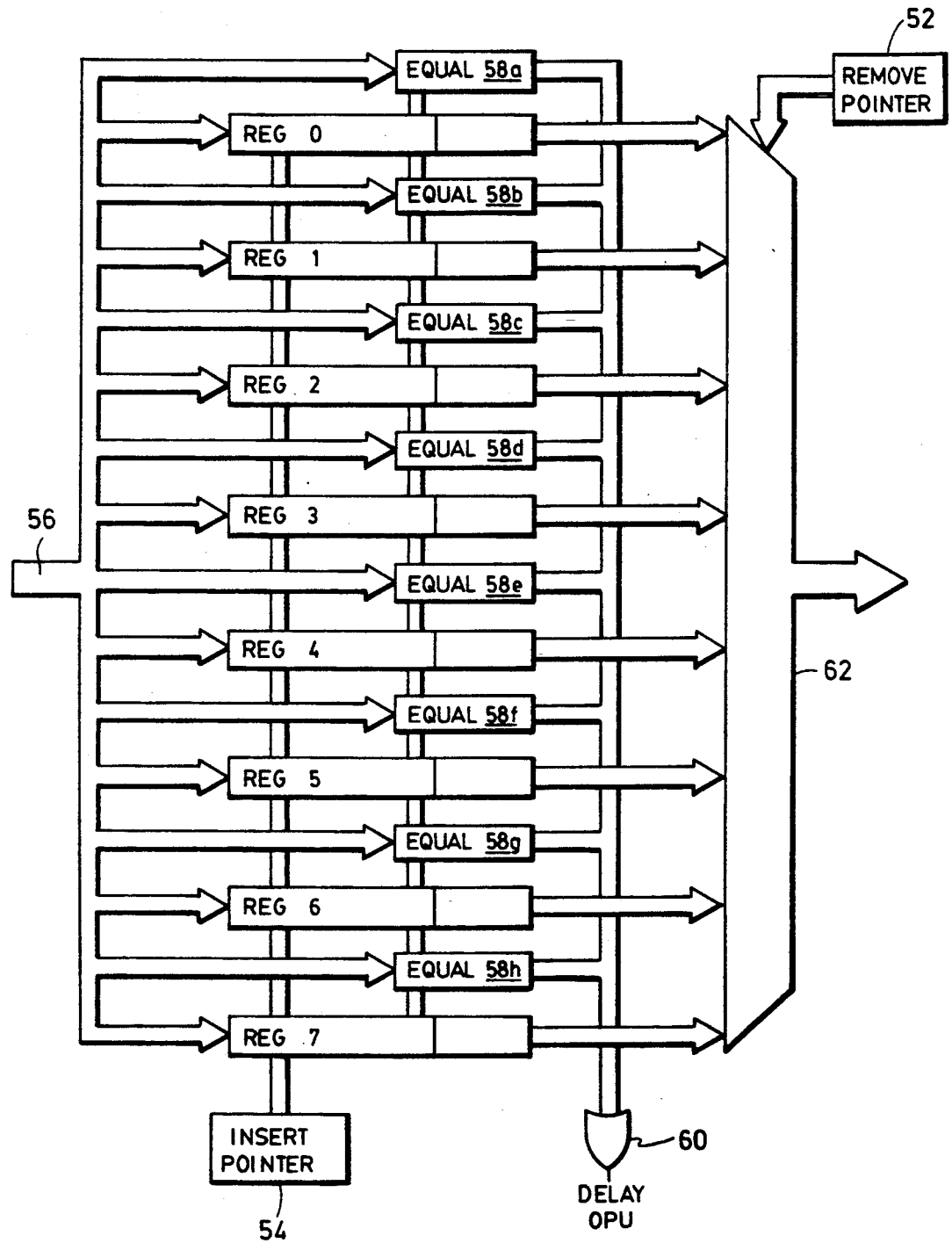
FIG. 4 is a detailed block diagram of the write queue circular buffer.

Referring now to FIG. 4, a detailed block diagram of the write queue 36 is illustrated. The 29-bit physical address is delivered to registers 0-7 (REG 0 to REG 7) over an address bus 56. A three-bit counter with eight decoded outputs provides the insert pointer, and a respective one of its decoded outputs is fed to the clock enable input of each of the registers 0-7. Thus, the insert pointer counter 54 enables only one of the registers 0-7 to receive the physical address present on the address bus 56 at any given time. Further, it should be noted that the address bus 56 is used to convey both read and write addresses at different times. The address bus 56 conveys a read/write control bit indicating whether the address bus currently conveys a destination address for a write operation. Accordingly, the clock enable input of each register receives the logical AND of this control bit and the respective output of the insert pointer counter. Therefore, an address is loaded into the register indicated by the remove pointer when the address corresponds to a write address, i.e., when the read/write control bit is a one. The insert pointer counter 54 also receives this control bit as a count enable signal so that the insert pointer becomes incremented immediately after a write address is loaded into the write queue.

Conversely, if the read/write control bit is a zero, the address corresponds to an operand for a read instruction, and thus the 29 bits corresponding to the physical read address are delivered to comparators 58a-58h. Each of the comparators 58a-58h also receives inputs from the 29-bit physical write addresses contained in each of the corresponding registers 0-7. The physical read address is compared to each of the valid write addresses and if there is a match, the comparator sends an output signal to an OR gate 60. The output of the OR gate 60 is supplied to the OPU 22 to stall the pre-processing of further operands until the write operation to that address is completed.

To prevent the read address from being compared to a write address which is invalid, the valid bit of the write address tags is used to enable the comparators 58a-58h. Each valid bit is set when the respective register is enabled to receive a new write address, and each valid bit is reset when a write address is removed from its respective register. In this manner only those registers which contain pending write addresses are compared to the present read address. Thus, a read operation is delayed only as long as all of the previous write operations to that same address are pending.

The remove pointer 52 is a 3-bit counter connected to the select lines of a multiplexer 62. The multiplexer 62 inputs are connected to the outputs of the write queue registers 0-7, and its output is connected to the memory access unit cache 28. Therefore, the remove pointer 52 controls which of the registers will be delivered to the cache 28. Operation of the multiplexer 54 is effected by the execution unit 20. When the data from a write instruction is available, the multiplexer is enabled and the data is delivered to the cache 28. It should also be apparent that, in addition to selecting a particular register, the remove pointer is decoded and the decoded outputs are gated with an "increment remove pointer signal" (see FIG. 9) in order to provide respective reset signals for the valid bit register locations. The "increment remove pointer" signal is also fed to the count enable input of the remove pointer counter.

Figure 5:
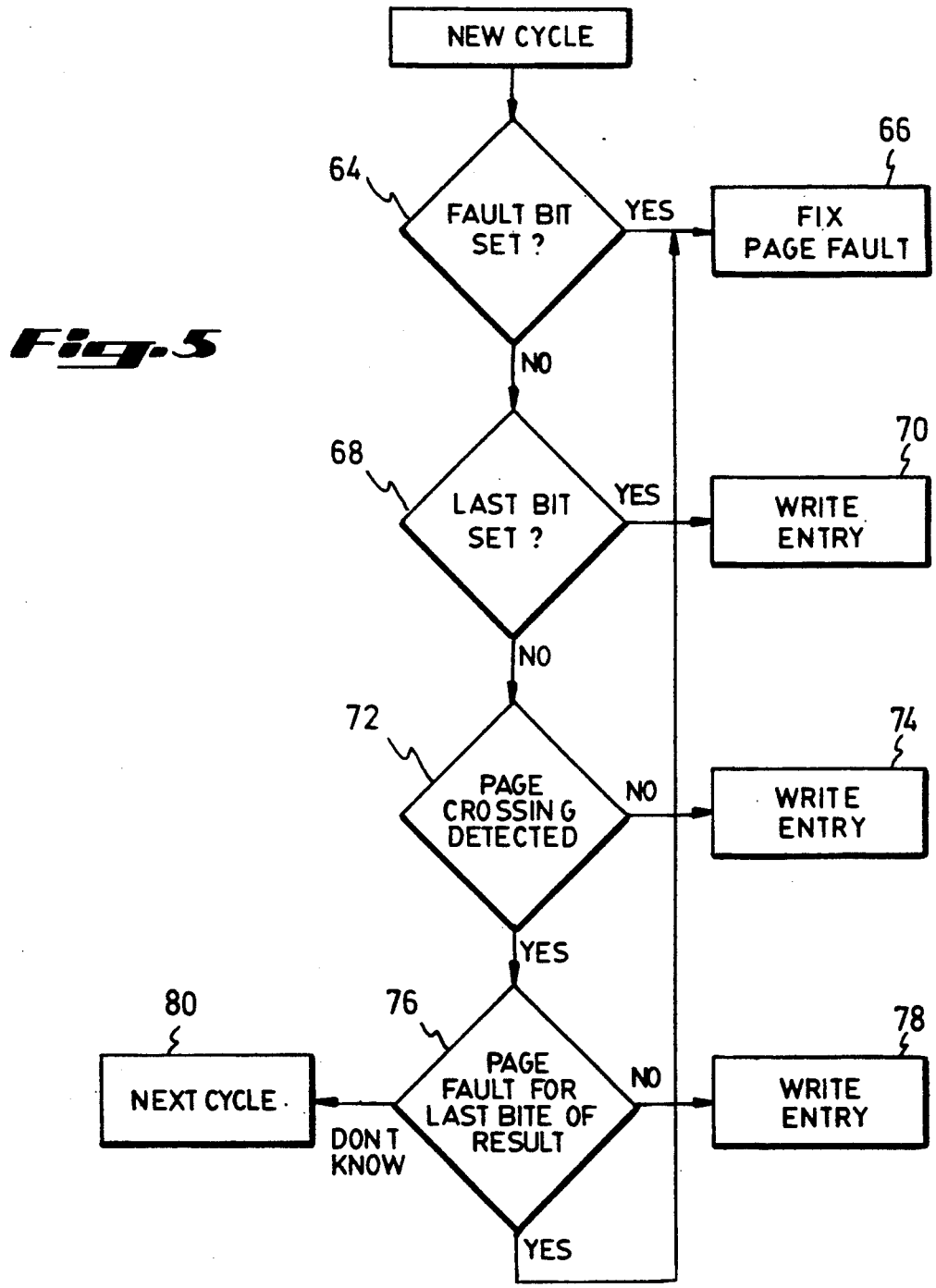
FIG. 5 is a flowchart illustrating various conditions which are tested and corresponding actions which are taken for preventing write operations which will result in memory page faults.

Referring now to FIG. 5, there is shown a flowchart illustrating control logic for preventing write operations which will result in memory page faults. At the beginning of the clock cycle, the contents of the write queue register 0-7 which is selected by the remove pointer 52 are delivered through the multiplexer 62, and respective ones of the tag bits are inspected. First, in decision block 64, the "fault bit" is inspected to determine if the memory page is located in the cache 28. If the fault bit is set, control transfers to block 66 where the hardware retrieves the selected page from the main memory 14. In most cases the page will be present in the cache 28 and control will transfer to decision block 68.

In step 68, the "last bit" is inspected to determine if the address is the last in a series of addresses of a multi-precision result. If the last bit is set, control transfers to block 70 and the physical address is delivered to the cache 28 to complete the actual write operation. Otherwise, the address is the desired storage location of the first or an intermediate portion of a multi-precision result. A multi-precision write operation stores data at a plurality of consecutive memory locations and the last bit is set at the address corresponding to the last byte of the multi-byte write operation. Even though a page fault is not detected during translation of the first address of such a multiprecision result, the last address might address a different page than the first address. Therefore, the first portion of a multiprecision result should not be written until it has been determined that a page fault will not occur for the last portion.

Accordingly, in decision block 72 a page change detect signal (PCD) is inspected. The PCD signal indicates whether the remaining bytes of the multi-byte write operation are located on the same page as the present address. This condition can be determined from the present physical address itself since it occurs when the physical address is at the end portion of a page; decoding logic for this purpose is shown in FIG. 8 and further described below. If PCD is not set, indicating that all of the bytes are located on the same page in memory and there can be no page error, then the write operation is allowed to proceed in block 72. However, if there is a change in pages, control logic should look at the fault bits in other entries in the write queue in order to resolve the conflict as soon as possible and thereby avoid delay in writing the result to memory.

It is not necessary to inspect the fault bit for each byte in the multi-precision write operation. Rather, it is only necessary to check the fault bit of the last byte address because the beginning and end of the write operation will necessarily be in different pages if any of the bytes of the word cross the page boundary. Therefore, in decision block 76, control logic looks ahead at the tag bits in the queue to find the queue address of the "next last byte" of the multi-precision result. The "next last byte" is indicated by the next write queue address (in the clockwise direction) having its "last bit" set. If the "fault bit" of the last byte is set the page is not available in the cache 28 and must be retrieved from the main memory 14. Alternatively, if the "fault bit" is not set, then both pages are present and the write may proceed in block 78.

Figure 6:
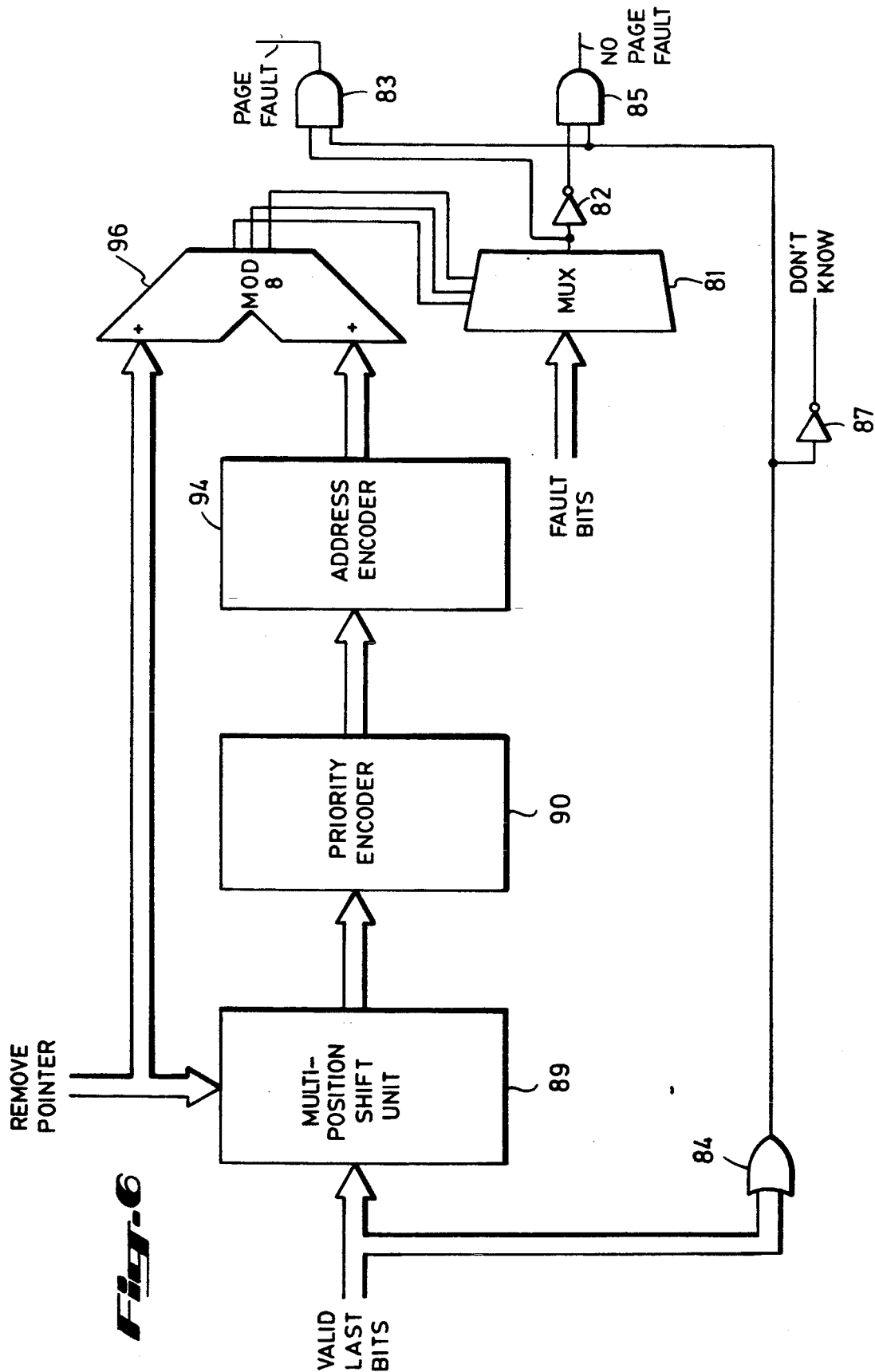
FIG. 6 is a general block diagram of a circuit used for locating the last byte of data of a particular write operation in the write queue.

Referring now to FIG. 6, there is shown a block diagram of the logic circuit used to detect whether a page fault exists for the last byte of a multiprecision result. This is done by finding the address of the "next last byte" and selecting the corresponding fault bit with a multiplexer 81. The output of the multiplexer 81 is passed through an inverter 82 and ANDed in an AND gate 83 with a signal from an OR gate 84 indicating whether any valid last bit exists in the queue. An AND gate 85 combines the "don't know" and inverted fault bit signal to arrive at a signal that is "high" when there is no page fault.

The method of locating the "next last adjust" address would seem to be a straightforward process of sequentially testing for the next last adjust flag, beginning at the remove pointer and proceeding clockwise around the circular register until the first occurrence of such a flag. While this is true, the logic circuitry necessary for such a test is extensive. For example, sixty-four AND gates having 2 to 9 inputs and eight 8-input OR gates would be required. This circuitry can be greatly simplified by shifting all of the addresses contained in the write queue such that the remove pointer is translated to a zero address. The logic circuit need only determine the next last adjust address relative to the remove pointer and add this relative address to the remove pointer absolute address. It is considerably easier to determine the "NEXT LAST BYTE" address relative to a fixed address. (Only seven AND gates are required, as will be shown in FIG. 7). Because the remove pointer can assume any of the eight positions in the circular buffer, the logic for a direct determination would have to assign a priority to each register depending upon its location relative to the remove pointer. Clearly, the remove pointer has the highest priority with priority descending in a clockwise direction beginning at the remove pointer. Conversely, in the preferred system of FIG. 6, a priority encoder 90 assumes that the remove pointer is located at the zero address. The highest priority is still assigned to the remove pointer, but the remove pointer is "translated" to always be at a "zero address" by a multiposition shift unit 89. Accordingly, priority has to be determined and assigned for only one of the eight possible cases that would exists if it could not be assumed that the remove pointer is the zero address. The output of the priority encoder is referenced, however, to the "zero address", and not the actual address of the remove pointer. Therefore, an address encoder 94 is used to convert the output of the priority encoder to an address relative to the "zero address", and a modulo-8 (three-bit) adder 96 adds that relative address to the value of the remove pointer to obtain the address of the pertinent fault bit to be selected by the multiplexer 81.

Figure 7:
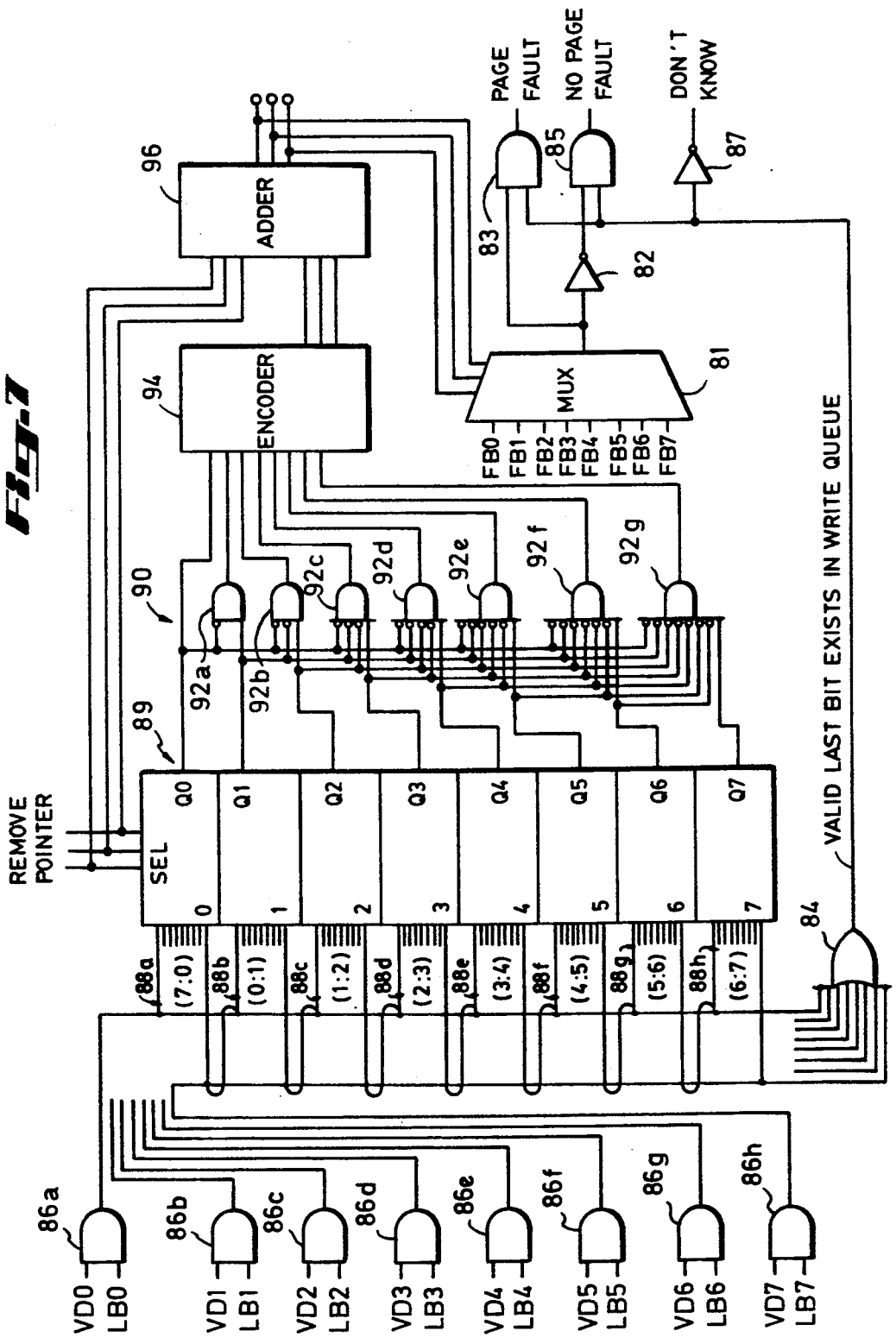
FIG. 7 is a schematic diagram of a specific circuit in accordance with the block diagram in FIG. 6.

FIG. 7 is a schematic diagram of a preferred embodiment of the block diagram illustrated in FIG. 6. Each of the "last bits" LB0-LB7 from the "last bit" output of the respective register in the circular buffer is combined in a series of 2-input AND gates 86a-86h with the respective "valid bit" from the "valid bit" output of that same register VD0-VD7 to ensure that the address is valid. The outputs of all these AND gates 86a-86h form the inputs to a bank of eight 8-input multiplexers 88a-88h that in combination form the shift unit 89. The multiplexers 88a-88h act as a "barrel shifter" to shift all of the "valid last bits" so that the remove pointer is effectively translated to the zero address with respect to the "valid last bits." Therefore, a simple priority encoder 90 including seven AND gates 92a-92g determines the next valid last bit with reference to the remove pointer 52.

The eight outputs of the AND gates 86a–86h are connected directly to all of the inputs of each of the multiplexers 88a–88h, but each input is connected in a different way such that: if the remove pointer is zero, the multiplexer outputs Q0, Q1, Q2, ..., Q7 directly correspond to the last bits LB0, LB1, LB2, ..., LB7; if the remove pointer is one, the multiplexer output Q0, Q1, Q2, ..., Q7 corresponds to LB1, LB2, ..., LB7, LB0; etc.; and if the remove pointer is seven, the multiplexer outputs Q0, Q1, Q2, ..., Q7 corresponds to LB7, LB0, ..., LB6. This is accomplished by physically altering the connection pattern of the AND gate outputs to the multiplexer inputs so that the connections to the set of eight input lines for each multiplexer is rotated by one input position relative to the set of input lines for its neighboring multiplexers.

It can be seen that since the remove pointer address controls the selected input of each multiplexer 88c–88g, the output of the shift unit 89 will be, in effect, a shifted version of the valid "last" bits in the write queue 36 with the valid bit at the address of the remove pointer 52 being located at Q0. For example, if the remove pointer 52 is located at the fourth register of the write queue 36, then the shift unit 89 will deliver inputs LB4, LB5, LB6, ..., LB3 on the outputs Q0–Q7. Therefore, the valid "last" bit of the fourth write queue register is delivered on address Q0.

The multiplexer outputs Q0–Q7 are delivered to the priority encoder logic circuit 90 for determining which write queue address is the "next last adjust". Since the write queue addresses have been shifted to place the remove pointer at Q0 and the remaining addresses at Q1–Q7 in the original order, priority must be Q0–Q7. Q7 can only be the "next last adjust" if none of the other addresses Q0–Q6 are last adjusts. Similarly, Q6 can only be a last adjust address if none of the addresses Q0–Q5 are last adjusts Conversely, if Q0 is a last adjust then it must be the next last adjust. Accordingly, the logic circuit includes seven AND gates 92a–92g where each output is ANDed with the inverse of those registers having higher priorities. Q7 must be combined with the inverse of all the remaining registers Q0–Q6, and Q6 must be combined with the inverse of only registers Q0–Q5.

The outputs of the AND gates 92a–92g plus the Q0 output of the multiplexer 85 form the inputs to an address encoder 94. The structure of the priority encoder 90 allows only a single output to be "asserted" at one time. Each of the AND gates 92a–92g is mutually exclusive to the others. It is possible, however, that none of the outputs of the priority encoder 90 is high. This case occurs when there are no valid last bits in the write queue 36, and it is treated as a special case. An OR gate 96 detects when any valid last bit exists in the write queue, and its output qualifies the final result.

The address encoder 94 outputs a 3-bit address corresponding to the address of the next last adjust relative to the remove pointer address. For example, if the next last adjust address is at the register corresponding to the Q4 output of the multiplexer 85, then the respective AND gate 92d will deliver an "asserted" signal to the encoder 94 which will produce an output of 100. This indicates that the next last adjust address is located four registers from the remove pointer address.

Therefore, to arrive at the next last adjust address, the output of the encoder 94 is added to the remove pointer address. The encoder output and the remove pointer address are connected to respective 3-bit inputs of an adder 96. The adder 96 outputs the lower 3-bits of the resultant sum as the absolute next last adjust address. Thus, in the examples discussed previously, where the remove pointer is located at absolute address four (100) registers removed from the remove pointer, the lower 3-bit sum from the adder is zero (000). Therefore, the next last adjust address is located in register four of the circular buffer. Accordingly, the adder 96 delivers the write queue address of the next last byte to the select inputs of the multiplexer 81. The inputs to the multiplexer 81 are the fault bits of the write queue registers.

FIG. 8 illustrates the page crossing detection logic. The lower nine bits of the physical address (from the multiplexer 62 of FIG. 4) are used to determine if the data to be written will cross a page boundary. Each page of data consists of 512 bytes arranged in 64 8-byte lines. The upper bits indicate the line on the page, while the lower three bits indicate the byte location within a line. To determine whether a write will result in crossing a page boundary, it is only necessary to know the first byte location on the page and the length of the data to be written.

Since the maximum write length of 8 bytes occurs during a quad-write and each line is 8 bytes long, there is a danger of crossing a page boundary only when writing to the last line of the page. Therefore, addressing of the last line of the page is detected by a 6-input AND gate 100. But a quad-word can be properly written on the final 8-byte line, if it is aligned such that it begins at location 504 (111111000). A quad-word write beginning at any location greater than 504 will necessarily cross a page boundary since fewer than 8 bytes remain on the page. Therefore, a 3input OR gate 102 can detect that any quadword is not properly aligned. A final 3input AND gate 104 detects a quad page crossing by qualifying the output of the OR gate 102 with the "quad bit" and the "last line of page" signal.

Similarly, a longword write must begin at location 508 or less to accommodate its 4-byte length. Therefore, the longword will cross the page if address bits A2 to A8 are all ones unless bits A0 and A1 are zeros. Alignment of the longword is detected by a 2-input OR gate 106. The longword case is detected by an inverter 108, and the combination of conditions for a longword page crossing is detected by a 4-input AND gate 110.

A 2-input OR gate 112 combines the quadword and longword page crossing signals to provide the desired PCD signal.

Figure 9:
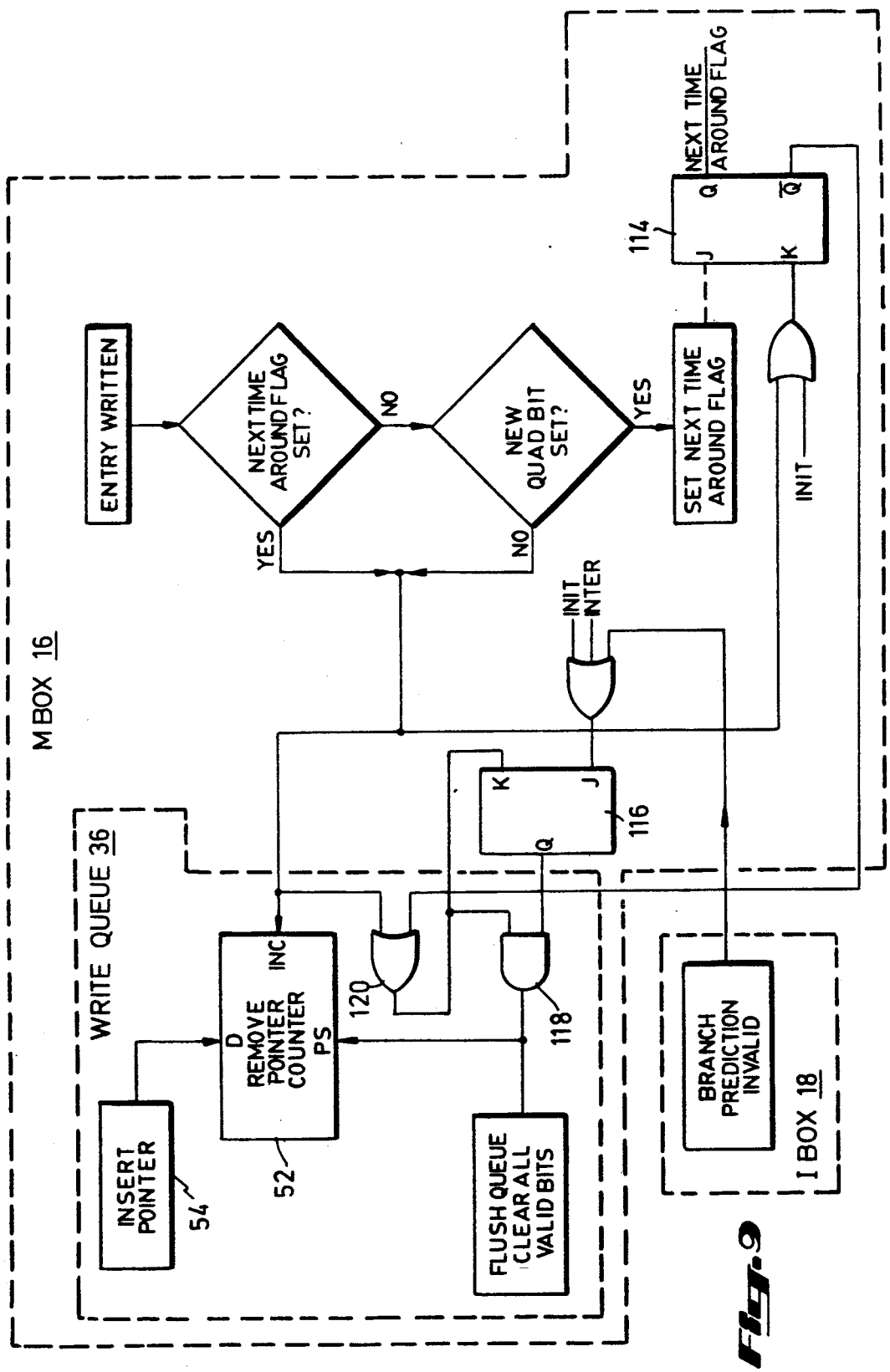

Turning now to FIG. 9, there is shown a schematic diagram of control logic for incrementing the remove pointer counter and flushing the write queue. Usually the remove pointer 52 is incremented each time an entry is written to memory. The quadword, however, is a special case; the write queue 36 includes a single entry for each quadword write, but each quadword write requires two write operations. A flip-flop 114 is used to provide a "next time around flag" which is set when the first half of the quadword is written. Therefore, when a result is written to the physical address at the head of the write queue 36, the remove pointer counter 52 is incremented only if the "next time around" flag is set, or the "new quad" bit is not set. If the "next time around" flag is not set but the "new quad" bit is set, the "next time around" flag is set. The "next time around" flag is cleared when the remove pointer counter 52 is incremented, or during initialization.

Flushing should occur either when a branch prediction is invalid as detected by the instruction unit, or in response to an interrupt or other exception or an initialization signal. However, flushing should not occur in the middle of a quadword write. Therefore, a flip-flop 116 stores a flush request signal until the last half of any pending quadword write is written. The flush signal is generated by an AND gate 118 and OR gate 120.

Upon flushing, the remove pointer counter 52 is set to the value of the insert pointer counter 54 and all "valid bits" are cleared.

We claim:

1. Apparatus for controlling memory access during execution of memory access instructions in a program for a pipelined processor, said apparatus comprising:
a memory having a plurality of addressable storage locations for storing data at a specified one of said addressable storage locations in response to receiving said data and the corresponding address;
means for preprocessing said instructions including means for fetching an operation code and at least one operand specifier for each instruction and delivering a specified address and at least one read/write signal in response to decoding, said read/write signal indicating whether said address is a read address for a specified source operand or a write address for a specified destination operand, said read addresses being delivered for fetching the specified source operands from the memory;
executing means responsive to said operation code for performing an operation corresponding to said operation code upon the specified operand when said operand is a source operand, and delivering resultant data to said memory when said operand is a destination operand;
write buffer means for receiving the specified addresses and the read/write signals from the preprocessing means, storing the write addresses, and delivering the stored addresses to said memory in response to receiving the resultant data corresponding to the write address;
means for comparing the read addresses with each of the addresses stored in the write buffer means, and delivering a stall signal in response to at least one of the addresses stored in the write buffer being equivalent to one of the read address; and
means responsive to said stall signal for stalling said means for preprocessing, whereby the fetching of source operands from said memory is delayed until the corresponding write buffer addresses have been delivered to said memory and the result data corresponding to said write buffer addresses are available from said executing means.

2. Apparatus, as set forth in claim 1, wherein the write buffer means includes a first-in first-out buffer having a plurality of registers, an insert pointer indicating the register where the next write address will be stored, and a remove pointer indicating which of the plurality of registers contains the address corresponding to the received resultant data.

3. Apparatus, as set forth in claim 1, wherein the preprocessor means includes means for predicting which of alternative instruction paths execution of the program will take in response to a branching instruction, placing the predicted instructions in the pipeline, and delivering a flush signal in response to detecting that execution of the program will not take the predicted path; and said apparatus further comprises means for invalidating the write addresses stored in the write buffer means in response to receiving the flush signal.

4. Apparatus, as set forth in claim 3, wherein:
said executing means includes means for delivering multiple words of resultant data resulting from a single operation to be stored in said memory at a plurality of consecutive write addresses, and means for delivering a signal indicating the delivery of said multiple words of resultant data; and
said apparatus further comprises means for preventing delivery of the flush signal in response to receiving the signal indicating the delivery of said multiple words of resultant data.

5. Apparatus, as set forth in claim 1, further including a main memory having a plurality of subdivisions of a preselected length;
a cache memory having a portion of the main memory subdivisions stored therein;
means for setting a page change flag in response to detecting that data stored beginning at an address stored in the write buffer means will be stored in separate cache memory subdivisions;
means for comparing the cache memory subdivisions to the subdivisions needed to store the data at the address stored in the write buffer means in response to the page change flag being set, and delivering a first signal in response to the needed memory subdivision being unavailable in the cache; and means for preventing storing of the data in response to receiving the first signal.

6. Apparatus, as set forth in claim 5, wherein:
said preprocessing means includes means for delivering a plural word indicating signal indicating when one of said write operands specify a plurality of words of resultant data to be stored at consecutive write addresses;
said write buffer means further includes means for storing, responsive to said plural word signal, the multiple consecutive write addresses associated with said plural word signal, and an indication flagging the last consecutive write address associated with said plural word signal being stored; and
said comparing means for comparing the cache memory subdivisions includes means for determining the needed memory subdivision of the next write address having being stored and flagged by said indication as the last consecutive write address associated with said plural word signal.

7. Apparatus, as set forth in claim 6, wherein said write buffer means includes storage registers for storing said write addresses, said storage registers have respective sequential addresses, and wherein said means for comparing includes:
shifting means for obtaining indications of ones of said registers storing last consecutive write addresses associated with said plural word signal and shifting said indications in response to the address of the storage register storing the write address of the next resultant data to be delivered by said means for executing to obtain a series of indications beginning with an indication of whether the write address of the next resultant data to be delivered by said means for executing is the last consecutive write address associated with said plural word signal, and
priority encoder means responsive to said series of indications to obtain a relative address of the register storing the next last consecutive write address associated with said plural word signal, said relative address being relative to the address of the storage location storing the write address of the next resultant to be delivered by said means for executing, and means for translating said relative address by the address of the storage location storing the write address of the next resultant to be delivered by said means for executing, to thereby obtain the address of the register storing the last consecutive write address associated with said plural word signal.

8. Apparatus for controlling memory access during execution of memory access instructions in a program for a pipelined processor, said apparatus comprising:

a memory having a plurality of addressable storage locations for storing data at a specified one of said addressable storage locations in response to receiving said data and the corresponding address;

means for preprocessing said instructions including means for fetching an operation code and at least one operand specifier for each instruction and delivering a specified address and at least one read/write signal in response to decoding, said read/write signal indicating whether said address is a read address for a specified source operand or a write address for a specified destination operand, said read addresses being delivered for fetching the specified source operands from the memory;

executing means responsive to said operation code for performing an operation corresponding to said operation code upon the specified operand when said operand is a source operand, and delivering resultant data to said memory when said operand is a destination operand;

write buffer means for receiving the specified addresses and the read/write signals from the preprocessing means, storing the write addresses, and delivering the stored addresses to said memory in response to receiving the resultant data corresponding to the write address;

wherein the preprocessor means includes means for predicting which of alternative instruction paths execution of the program will take in response to a branching instruction, placing the predicted instructions in the pipeline, and delivering a flush signal in response to detecting that execution of the program will not take the predicted path; and said apparatus further comprises means for invalidating the write addresses stored in the write buffer means in response to receiving the flush signal.

9. Apparatus, as set forth in claim 8, wherein:

said executing means includes means for delivering multiple words of resultant data resulting from a single operation to be stored in said memory at a plurality of consecutive write addresses, and means for delivering a signal indicating the delivery of said multiple words of resultant data; and said apparatus further comprises means for preventing delivery of the flush signal in response to receiving the signal indicating the delivery of said multiple words of resultant data.

10. Apparatus, as set forth in claim 8, further including a main memory having a plurality of subdivisions of a preselected length;

a cache memory having a portion of the main memory subdivisions stored therein;

means for setting a page change flag in response to detecting that data stored beginning at an address stored in the write buffer means will be stored in separate cache memory subdivisions;

means for comparing the cache memory subdivisions to the subdivisions needed to store the data at the address stored in the write buffer means in response to the page change flag being set, and delivering a first signal in response to the needed memory subdivision being unavailable in the cache; and means for preventing storing of the data in response to receiving the first signal.

11. Apparatus, as set forth in claim 10, wherein:

said preprocessing means includes means for delivering a plural word indicating signal indicating when one of said write operands specify a plurality of words of resultant data to be stored at consecutive write addresses;

said write queue means further includes means for storing, responsive to said plural word signal, the multiple consecutive write addresses associated with said plural word signal, and an indication flagging the last consecutive write address associated with said plural word signal being stored; and said means for comparing the cache memory subdivisions includes means for determining the needed memory subdivision of the next write address having being stored and flagged by said indication as the last consecutive write address associated with said plural word signal.

12. Apparatus, as set forth in claim 11, wherein said write buffer includes storage registers for storing said write addresses, said storage registers have respective sequential addresses, and wherein said means for comparing includes:

shifting means for obtaining indications of ones of said registers storing last consecutive write addresses associated with said plural word signal and shifting said indications in response to the address of the storage register storing the write address of the next resultant data to be delivered by said means for executing to obtain a series of indications beginning with an indication of whether the write address of the next resultant data to be delivered by said means for executing is the last consecutive write address associated with said plural word signal, and priority encoder means responsive to said series of indications to obtain a relative address of the register storing the next last consecutive write address associated with said plural word signal, said relative address being relative to the address of the storage location storing the write address of the next resultant to be delivered by said means for executing, and means for translating said relative address by the address of the storage location storing the write address of the next resultant to be delivered by said means for executing, to thereby obtain the address of the register storing the last consecutive write address associated with said plural word signal.

13. Apparatus for controlling memory access during execution of memory access instructions in a program for a pipelined processor, said apparatus comprising:

a main memory having a plurality of subdivisions of a preselected length;

cache memory having a plurality of storage locations each being identified by a specified address, the cache memory being adapted for delivering data stored at a preselected storage location in response to receiving a signal indicating a read operation and a specified address, and for storing data at a preselected storage location in response to receiving a signal indicating a write operation and a specified address, the cache memory having a portion of the main memory subdivisions stored therein;

means for preprocessing said instructions including means for fetching an operation code and at least one operand specifier for each instruction and delivering a specified address and at least one read-/write signal in response to decoding, said read-/write signal indicating whether said address is a read address for a specified source operand or a write address for a specified destination operand, said read addresses being delivered for fetching the specified source operands from the memory;

executing means responsive to said operation code for performing an operation corresponding to said operation code upon the specified operand when said operand is a source operand, and delivering resultant data to said memory when said operand is a destination operand;

write buffer means for receiving the specified addresses and the read/write signals from the preprocessing means, storing the write addresses, and delivering the stored addresses to said memory in response to receiving the resultant data corresponding to the write address; stored addresses to said memory in response to receiving the resultant data corresponding to the write address;

means for setting a page change flag in response to detecting that data stored beginning at an address stored in the write buffer means will be stored in separate cache memory subdivisions;

means for comparing the cache memory subdivisions to the subdivisions needed to store the data at the address stored in the write buffer means in response to the page change flag being set, and delivering a first signal in response to the needed memory subdivision being unavailable in the cache; and means for preventing storing of the data in response to receiving the first signal.

14. Apparatus, as set forth in claim 13, wherein:

said preprocessing means includes means for delivering a plural word indicating signal indicating when one of said write operands specify a plurality of words of resultant data to be stored at consecutive write addresses;

said write buffer means further includes means for storing, responsive to said plural word signal, the multiple consecutive write addresses associated with said plural word signal, and an indication flagging the last consecutive write address associated with said plural word signal being stored; and said comparing means for comparing the cache memory subdivisions includes means for determining the needed memory subdivision of the next write address having being stored and flagged by said indication as the last consecutive write address associated with said plural word signal.

15. Apparatus, as set forth in claim 14, wherein said write buffer means includes storage registers for storing said write addresses, said storage registers have respective sequential addresses, and wherein said means for comparing includes:

shifting means for obtaining indications of ones of said registers storing last consecutive write addresses associated with said plural word signal and shifting said indications in response to the address of the storage register storing the write address of the next resultant data to be delivered by said means for executing to obtain a series of indications beginning with an indication of whether the write address of the next resultant data to be delivered by said means for executing is the last consecutive write address associated with said plural word signal, and priority encoder means responsive to said series of indications to obtain a relative address of the register storing the next last consecutive write address associated with said plural word signal, said relative address being relative to the address of the storage location storing the write address of the next resultant to be delivered by said means for executing, and means for translating said relative address by the address of the storage location storing the write address of the next resultant to be delivered by said means for executing, to thereby obtain the address of the register storing the last consecutive write address associated with said plural word signal.

16. A method of controlling memory access during execution of memory access instructions in a program for a pipelined processor, said pipeline processor including: a memory having a plurality of addressable storage locations for storing data at a specified one of said addressable storage locations in response to receiving said data and the corresponding address: an operand processing unit for preprocessing said instructions including means for fetching an operation code and at least one operand specifier for each instruction and delivering a specified address and at least one read/write signal in response to decoding, said read/write signal indicating whether said address is a read address for a specified source operand or a write address for a specified destination operand, and an execution unit responsive to said operation code for performing an operation corresponding to said operation code upon the specified operand when said specified operand is a source operand, and delivering resultant data to said memory when said operand is a destination operand; said method including the steps of:

(a) inserting said write addresses delivered by said means for preprocessing in a first-in first-out queue until said execution unit delivers the corresponding resultant data to said memory, and thereupon removing said write addresses from said queue and storing the corresponding resultant data in said memory at the write addresses removed from said queue; and (b) comparing said read addresses delivered by said operand processing unit with each of the addresses stored in the queue, and stalling said operand processing unit when at least one of the write addresses in the queue is equivalent to one of the read addresses, whereby the fetching of source operands from said memory is delayed until the corresponding write buffer addresses have been delivered to said memory and the resultant data corresponding to said write buffer addresses are available from said executing means.

* * * * *